though it is to be appreciated that the present invention

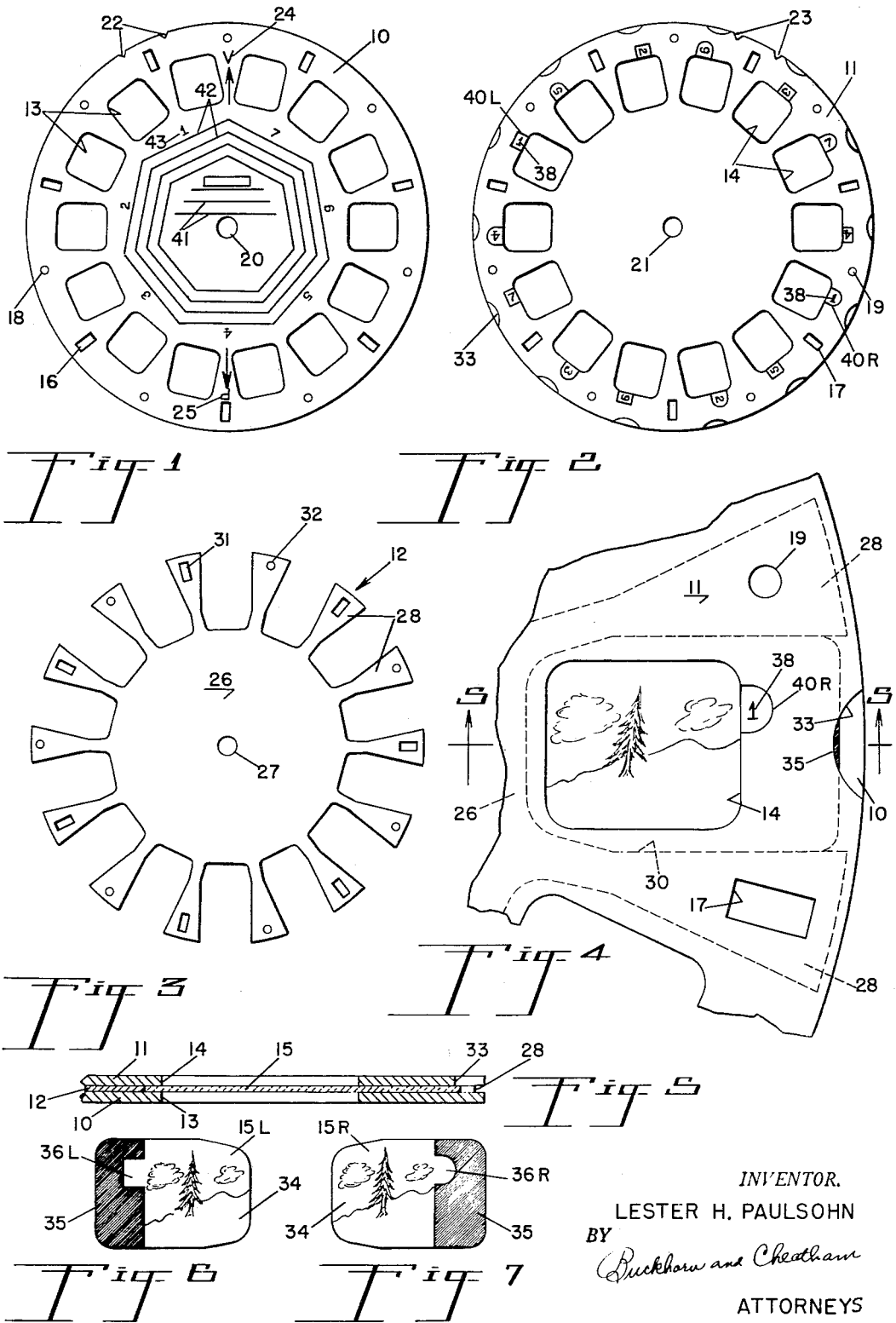

United States Patent Office 2,713,015
Patented July 12, 1955

2,713,015

METHOD OF MANUFACTURING HOLDER FOR STEREO-PAIRED TRANSPARENCIES

Lester H. Paulsohn, Portland, Oreg., assignor to Sawyer's Inc., Portland, Oreg., a corporation of Oregon Original application December 8, 1951, Serial No. 260,657. Divided and this application March 31, 1953, Serial No. 345,809

2 Claims. (Cl. 154—118)

The present invention relates to a holder for stereo-paired transparencies comprising a flat member having opposed pockets adapted to receive stereo-paired transparencies to hold the same in a common plane and in proper relation to each other for stereoscopic viewing.

This application is a division of my copending application Serial No. 260,657, filed December 8, 1951.

The present invention comprises an improvement upon the invention disclosed and claimed in the patent to Gruber, No. 2,189,285, issued February 6, 1940, entitled "Stereoscopic Viewing Device," and further comprises an improvement upon the invention disclosed and claimed in the patent to Kurz, No. 2,571,584, issued October 16, 1951, entitled "Stereoscopic Transparency Holder." The above-identified Gruber patent discloses the basic concept of a disc holder having a plurality of matched pairs of transparencies fixedly mounted therein, and the above-identified Kurz patent discloses a holder having open pockets with their mouths located at opposed edges of the holder whereby transparencies may be removably associated therewith, thus enabling an individual to mount his own personal transparencies in discs adapted for viewing through a device such as disclosed in the above-identified Gruber patent.

The present invention has for its objects the attainment of certain advantages over the construction disclosed and claimed in the above-identified Kurz patent, including simplicity of manufacture, durability of the holder, and facility of locating the transparencies in correct viewing relation to each other.

A further object of the invention is to provide an improved method of manufacture resulting in improved articles of the character disclosed above.

The present invention comprises a transparency holder having edgewise opening pockets therein and comprising a plurality of laminations, there being at least three laminations, an intermediate one of said laminations preferably comprising a thin sheet of metal of substantially the thickness of developed film and having radial arms, the lateral edges of which, together with the intermediate edges of the central portion of the lamination, define the sides and bottoms of the transparency receiving pockets, the outer pair of laminations preferably being formed of fibrous material and defining view openings through which the transparencies may be viewed.

Various advantages over prior constructions are derived from the present invention, as will presently appear.

The invention may be more thoroughly understood by reference to the accompanying drawing taken in connection with the following specification wherein like numerals refer to like parts throughout.

In the drawing,

Fig. 1 is a view of the obverse face of a preferred form of the present invention;

Fig. 2 is a view of the reverse face of the form of the invention disclosed in Fig. 1;

Fig. 3 is a view of a spider forming the central lamination of the preferred form of the invention;

Fig. 4 is an enlarged, detail view of a portion of the preferred form of the invention showing a transparency mounted in one of the pockets;

Fig. 5 is a vertical section taken substantially along line 5—5 of Fig. 4;

Fig. 6 is an enlarged view of the rear face of the left one of a stereo-pair of transparencies adapted for mounting in the holder disclosed in Figs. 1 to 5 inclusive; and Fig. 7 is a similar view of the right one of the stereo-pair of transparencies.

While it is to be appreciated that the present invention comprises a holder particularly adapted for use in a viewing device such as disclosed in the above-identified Gruber patent, it is also to be appreciated that the present invention may be embodied in holders designed for use in other types of stereoscopic viewers, such as holders mounting a single pair of stereo-paired transparencies. In the preferred form of the invention herein disclosed in detail the invention comprises a disc holder including an outer lamination 10 forming the obverse face of the assembled holder, a second outer lamination 11 forming the reverse face of the disc holder, and an inner lamination 12 comprising a spider which is secured between the pair of outer laminations, preferably by adhering their contiguous surface portions together. The outer laminations are preferably formed of stiff, coated paper board having good printing qualities, but any other sheet material may be substituted therefor if desired. Fibrous sheet material is preferred since it will permit the penetration of adhesives to a certain extent for a purpose to be explained. The intermediate lamination 12 may be formed of any suitable sheet material but thin sheet metal is preferred, first because sheet metal of uniform thickness may be severed from a larger sheet such as by a stamping or punching operation to provide clean edges having exact dimensions and exactly positioned with respect to each other to match the edges of stereo-paired transparencies in order to maintain the same in exactly proper relation for stereoscopic viewing, and secondly because the sheet-metal lamination will impart durability to the finished holder permitting repeated use thereof in a viewing or projecting device without danger that the stepwise feeding mechanism thereof will damage the holder.

The outer lamination 10 is provided with a concentric series of substantially rectangular view openings 13 arranged in equidistantly spaced relation to each other slightly inward from the periphery of the disc. The outer lamination 11 is provided with a matching series of view openings 14 which register with the openings 13 when the holder is assembled. The view openings are preferably rectangular with rounded corners and of such dimensions as to permit the passage of light through the greater portion of a transparency 15 mounted therein. The openings are preferably fourteen in number so as to provide seven pairs of openings.

The lamination 10 is also provided with a series of perforations 16 arranged concentrically and equidistantly about the disc, the perforations being equidistantly placed between alternate adjacent pairs of openings 13 and being close to the periphery of the disc, the perforations preferably being substantially rectangular in outline. The outer lamination 11 is provided with a matching series of perforations 17 which register with the perforations 16 when the holder is assembled. The perforations provide means for the engagement of feeding and locating members in a viewer or other mechanism whereby the holder may be rotated step by step to position alternate pairs of stereo-paired transparencies horizontally and in alignment with the eyepieces of the viewer or equivalent mechanism.

The disc 10 is provided with a concentric series of small guide openings 18 equidistantly spaced between the perforations 16, and the disc 11 is provided with a matching series of openings 19 which register with the openings 18 when the holder is assembled. The openings provide assembly guides for the purpose of receiving aligning pins whereby exact registry of the various laminations is secured in assembling the holder.

The disc 10 is provided with a central, round opening 20, and the disc 11 is provided with a matching central, round opening 21 for the purpose of receiving a mounting spindle in an assembly jig, or in a projector or viewer. The disc 10 is provided with a pair of edge notches 22 and the disc 11 is provided with a matching pair of edge notches 23 for indexing purposes in automatic assembling machinery and to provide a sensable indicator at the edge of the assembled holder whereby a person using the holder may be apprised of the correct position to insert the holder in a viewing device or projector without requiring him to see the surfaces of the holder. To aid in this connection the obverse face of the holder is preferably provided with printed indicia such as indicated by the arrow and the letter V at 24, indicating the upper edge of the holder when placed in a viewing device, and the arrow and letter P indicated at 25, indicating the upper edge of the holder when placed in a projecting device.

The inner lamination 12 comprises a thin sheet of substantially the thickness of developed film, preferably being formed of light metal such as aluminum which may be easily punched from a larger sheet. The inner lamination comprises a spider having a central portion 26 of relatively large area through which is a central opening 27 adapted to register with the openings 20 and 21. A plurality of radially extending arms 28 project outwardly from the periphery of the central portion 26, the arms being relatively narrow and adapted to lie in the spaces between the view openings. The adjacent edges of a pair of arms define the side edges of pockets 30 into which the transparencies 15 may be slid edgewise through the open mouths of the pockets at the periphery of the disc. The adjacent edges are parallel for the most part from the mouth of the pocket inwardly, but the inner ends thereof are preferably inclined toward each other to provide a tapered inner end on the pocket. The bottom edge of the pocket is defined by the peripheral edge of the central portion 26 between the arms 28. The side edges and bottom edge of the pocket are spaced inwardly to a slight extent from the corresponding edges of the view openings whereby overhanging portions of the discs 10 and 11 confine marginal portions of the transparencies 15 in order to maintain the transparencies in a common plane. The outer ends of the arms 28 define portions of a circle of slightly lesser diameter than the diameters of the discs 10 and 11 whereby the outer edges of the arms are spaced slightly inwardly from the periphery of the assembled holder. By reason of this construction it is assured that no sharp metal corners will project beyond the periphery of the disc and interfere with the step-by-step rotation thereof in a viewer or projector, even though the edge of the disc should be slightly worn away. Alternate arms 28 are provided with rectangular perforations 31, the edges of which register with the edges of the rectangular perforations 16 and 17, the metal of the central lamination thereby reinforcing the perforations in order that continued use thereof shall not wear the assembled holder to an extent that the step-by-step rotation would not be achieved to an exact extent. Similarly, alternate arms of the central lamination are provided with guide openings 32 adapted exactly to register with the openings 18 and 19 in order that the three laminations may be assembled in exact registry with each other.

The outer disc 11 is provided with a series of crescent-shaped notches 33 equidistantly spaced around its periphery so as to lie in radial alignment with the centers of view openings 14, the notches facilitating the insertion of the transparencies into the edgewise opening pockets.

The assembled holder is particularly designed for use with stereo-paired transparencies produced by a camera such as disclosed in the copending application of Gordon N. Smith, Serial No. 171,863, filed July 3, 1950, now Patent No. 2,680,400 entitled "Stereoscopic Camera." In such a camera pairs of transparencies comprising a right transparency 15-R and a left transparency 15-L are produced. Each transparency comprises a view portion 34 of exposed film and a tab portion 35 of unexposed film which is of sufficient width to extend from the outer edges of the view openings 14 to a point slightly beyond the inner extremity of the notch 33 so as to permit firm and full insertion of the transparency into the pocket and withdrawal thereof by means of a tweezers or the like. The camera is provided with means for producing identifying indicia on the transparencies comprising exposed areas extending from the view portion of the transparency into the tab portion 35. The indicia thus produced are of two types, one having a certain geometrical outline as indicated at 36-R to indicate the right transparency and the other having a different geometric outline as indicated at 36-L to indicate the left transparency.

The reverse face of the holder is provided with indicia means as by printing or embossing the same on the surface of the rear lamination 11, the indicia means preferably comprising a symbol and a character adjacent each view opening. The characters 38 adjacent each of a pair of view openings are the same, as seen in Fig. 2, and the characters adjacent one pair are different from the characters adjacent all other pairs on the holder. The characters preferably comprise a series of numerals ranging from 1 to 7, thus identifying the seven pairs of pockets. It will be apparent from inspection of Fig. 2 that the indicia means adjacent the view openings are adjacent the upper and outer corners thereof when the pair of view openings is arranged horizontally in position for viewing through a viewing device or projecting onto a screen, and that, when the holder is rotated counterclockwise as viewed in Fig. 2 step-by-step the angular amount represented by the spacing of the perforations 17, as each pair of transparencies arrives at the horizontal position the indicia means adjacent thereto will be adjacent the upper and outer corners thereof. The symbols adjacent the view openings are of two types, one type preferably being of a certain geometrical configuration indicated at 40-R corresponding to the exposed area 36-R, and the other type indicated at 40-L corresponding in outline to the exposed area 36-L. The views are quickly oriented with respect to the holder and slipped into their proper position by matching the exposed indicia on the transparencies with the symbol on the holder and slipping the transparencies into the pockets in such manner that the exposed indicia underlie the corresponding symbols on the holder. The indicia means could appear at any suitable or convenient location on the holder, but it is preferred that they appear adjacent the upper and outer corners of the view openings for the reason that the upper and outer corners of a transparency are usually the lighter portions thereof, this portion of the scene usually being in the sky area, and therefore the exposed areas 36 are usually of greatest contrast with the undeveloped film tabs 35.

The obverse face of the holder provided by the outer surface of the disc 10 is preferably provided with a centrally disposed series of printed guide lines such as indicated at 41 to facilitate the placing of a title on the holder, and a relatively concentric outer series of printed guide lines such as indicated at 42 to facilitate the placing of view captions on the holder. Adjacent each of the series of guide lines 42 there is provided a reference numeral indicated at 43, with the numerals corresponding to the numerals 38. It will be observed that the numerals are positioned midway between and above the numerals 38 of the corresponding views whereby the same, and their accompanying captions, may be viewed upright when the corresponding scenes are horizontally positioned. The guide lines 41 and 42 are preferably lightly printed on the surface of the holder so that they will not obscure identifying words afterwards written thereon when the transparencies are placed in the holder.

It will be observed in Fig. 5 that the thickness of the inner lamination 12 is substantially that of developed film whereby the marginal areas of the transparencies will be frictionally retained in the pockets and held against displacement unless deliberately withdrawn. The transparencies are thereby maintained in correct relation to each other for stereoscopic viewing.

The arms 28 are preferably provided with outwardly diverging sides throughout the greater portion of their length, but the necks of the arms adjacent the central portion 26 may have parallel sides, thus providing inwardly converging side edges on the pockets. This not only strengthens the construction but facilitates the insertion of the transparencies since they may likewise be provided with convergent side edges adjacent the inner ends thereof. Preferably all corners of the transparencies are rounded so as to eliminate sharp points which might interfere with the edgewise movement of the transparencies into the pockets. It is to be appreciated that the transparencies are punched or otherwise severed from a film strip having a series of views thereon as produced by a camera of the character described. The view openings could be of any desired configuration but it is preferred that they be substantailly rectangular in order that as great an amount of the views as possible within the limits of the holding device may be visible.

A preferred method of manufacturing the holders comprises the steps of coating both surfaces of a thin sheet of metal with a thin film of a heat-reactive adhesive, any of the common heat-reactive adhesives dissolved in a carrier, or emulsified in a carrier, being adaptable for the purpose. The adhesive films are then dried so as to provide a plain sheet of metal bearing a thin film of dry adhesive on each surface thereof, and thereafter the central laminations 12 are punched from the large sheet of metal so as to provide a spider having dry films of adhesive on the flat surfaces thereof but having all edges free of adhesive. The central lamination is then sandwiched between the preformed outer laminations 10 and 11 and exactly aligned therewith by means of guide pins extending through the guide openings 18, 19 and 32. The laminations are then pressed together while applying heat thereto to such an extent as to activate the heat-reactive adhesive to bond the laminations together. The outer laminations are preferably formed of fibrous sheet material capable of absorbing the adhesive to a certain extent so as to prevent any of the softened adhesive from flowing around the edges of the spider to form blocks against the insertion of the transparencies.

Having illustrated and described a preferred embodiment of my invention, it should be apparent to those skilled in the art that the same permits of modification in arrangement and detail. All such modifications as come within the true spirit and scope of the appended claims are to be considered a part of my invention.

I claim:

1. The method of manufacturing a laminated pocketed holder for stereo-paired transparencies, comprising coating both surfaces of a thin sheet of metal with a thin film of a heat-reactive adhesive, drying the adhesive, severing from the sheet an inner lamination having pocket defining, vertical, edge surfaces free of adhesive, placing said inner lamination between a pair of fibrous laminations, and applying heat and pressure to the superimposed laminations to affix the same together by reaction of said adhesive.

2. The method of manufacturing a laminated, pocketed, disc holder for stereo-paired transparencies having pockets opening to the periphery of the disc holder, comprising coating both surfaces of a large, thin sheet of metal with a thin film of a heat reactive adhesive in liquid form, drying the adhesive, stamping from the sheet a spider having a plurality of radial arms defining the edges of the pockets, all of said edges being free of adhesive, providing a matched pair of discs of fibrous material having matching openings therethrough in proper relation to register with the spaces between the arms of the spider, placing said spider between said fibrous discs and registering said arms with said openings, and applying heat and pressure to the flat surfaces of said discs to affix them to the opposed surfaces of said spider by reaction of said adhesive.

References Cited in the file of this patent

UNITED STATES PATENTS

| 2,189,285 | Gruber | Feb. 6, 1940 |
| 2,369,483 | Musebeck | Feb. 13, 1945 |
| 2,571,584 | Kurz | Oct. 16, 1951 |
| 2,618,197 | Boushey | Nov. 18, 1952 |

FOREIGN PATENTS

| 564,807 | Great Britain | Oct. 13, 1944 |
| 580,145 | Great Britain | Aug. 28, 1946 |